(12) United States Patent
Weiss et al.

(10) Patent No.: US 11,274,022 B2
(45) Date of Patent: Mar. 15, 2022

(54) PANTOGRAPH ASSEMBLY FOR LIFT TRUCK

(71) Applicant: Hyster-Yale Group, Inc., Fairview, OR (US)

(72) Inventors: Samuel Weiss, Portland, OR (US);
Samuel Arnold, Portland, OR (US);
Todd Morgan, Troutdale, OR (US)

(73) Assignee: HYSTER-YALE GROUP, INC., Fairview, OR (US)

( * ) Notice: Subject to any disclaimer, the term of this patent is extended or adjusted under 35 U.S.C. 154(b) by 0 days.

(21) Appl. No.: 17/009,467

(22) Filed: Sep. 1, 2020

(65) Prior Publication Data

US 2020/0399106 A1    Dec. 24, 2020

Related U.S. Application Data

(63) Continuation-in-part of application No. 15/970,229, filed on May 3, 2018, now Pat. No. 10,807,849.

(51) Int. Cl.
| | |
|---|---|
| *B66F 9/12* | (2006.01) |
| *B66F 9/22* | (2006.01) |
| *B66F 9/075* | (2006.01) |
| *F16L 11/12* | (2006.01) |
| *B66F 9/24* | (2006.01) |
| *B66F 9/16* | (2006.01) |

(52) U.S. Cl.
CPC ............ *B66F 9/122* (2013.01); *B66F 9/0755* (2013.01); *B66F 9/0759* (2013.01); *B66F 9/16* (2013.01); *B66F 9/22* (2013.01); *B66F 9/24* (2013.01); *F16L 11/12* (2013.01)

(58) Field of Classification Search
CPC ....................................................... B66F 9/122
USPC ............................................................ 414/661
See application file for complete search history.

(56) References Cited

U.S. PATENT DOCUMENTS

| | | | |
|---|---|---|---|
| 2,752,058 A | 6/1956 | Gibson | |
| 2,973,878 A * | 3/1961 | Gibson | ............... B66F 9/122 414/664 |
| 3,528,579 A | 9/1970 | Ulinski | |
| 3,675,803 A | 7/1972 | Baughman | |
| 4,274,794 A * | 6/1981 | Olson | ................... B66F 9/195 414/661 |
| 4,411,329 A | 10/1983 | Stedman | |
| 4,708,575 A * | 11/1987 | Farmer | .................. B66F 9/195 414/497 |
| 5,586,620 A | 12/1996 | Dammeyer | |
| 7,017,432 B2 | 3/2006 | Silverman | |
| 9,206,024 B2 | 12/2015 | Yahner | |
| 9,290,366 B2 | 3/2016 | Jones | |
| 2004/0045379 A1 | 3/2004 | Silverman et al. | |
| 2010/0068023 A1* | 3/2010 | Kuck | ....................... B66F 9/06 414/663 |
| 2014/0219758 A1 | 8/2014 | Soder et al. | |

(Continued)

FOREIGN PATENT DOCUMENTS

| | | |
|---|---|---|
| CN | 201962034 U | 9/2011 |
| WO | 2017/001507 A1 | 1/2017 |

*Primary Examiner* — Jonathan Snelting

(74) *Attorney, Agent, or Firm* — Schwabe Williamson & Wyatt

(57) ABSTRACT

A pantograph assembly may include a mast carriage assembly comprising a trunnion cross-member and a trunnion shaft coupled to the trunnion cross-member, and a pantograph mechanism coupled to the trunnion shaft.

19 Claims, 15 Drawing Sheets

(56) References Cited

U.S. PATENT DOCUMENTS

2018/0179039 A1  6/2018  O'Keeffe
2019/0337784 A1  11/2019  Weiss et al.

* cited by examiner

PANTOGRAPH ASSEMBLY FOR LIFT TRUCK

STATEMENT OF RELATED MATTERS

This application is a continuation-in-part application of U.S. patent application Ser. No. 15/970,229, filed May 3, 2018, the contents of which are all herein incorporated by reference in their entirety.

TECHNICAL FIELD

Embodiments relate to the field of material handling vehicles, such as fork lifts and pallet trucks.

BACKGROUND

Industrial vehicles such as forklift trucks, end-riders, center-riders, pallet trucks, walkies, and the like, may include a pair of forks configured to engage a pallet. The pallet may include one or more openings into which the forks are inserted prior to moving the pallet, and each opening may include upper and lower surfaces that provide stability to the pallet. Double-deep pallet stacking has become a popular stacking method in warehouses, production facilities, and other places where space is limited. The double-deep method of storing various pallets and materials increases efficiency by maximizing space utilization and improving the storage density. This reduces the operational costs and increases productivity significantly. However, standard forklifts are ill suited to accessing the back row of double-deep stacked goods. One approach to addressing this problem is the use of a pantograph or reach forklift, which allows the forks to be moved longitudinally toward the back row of a double-deep or even triple-deep stack.

A pantograph forklift is designed with a scissor reach mechanism that allows the operator to lift, reach, and place various loads with less effort. One of the main advantages of the pantograph forklift is its capability to lift and reach pallets in narrow and tight places where space is extremely limited. With compact and unique design, the pantograph forklift is ideal for handling all types of pallets, including those with low-profile openings.

SUMMARY

Disclosed is a pantograph assembly for use on a vehicle, such as a fork lift. In embodiments, the pantograph assembly includes a mast carriage assembly that has a trunnion cross-member and a trunnion shaft coupled to the trunnion cross-member. In embodiments, the pantograph assembly further includes a fork carriage assembly and a pantograph mechanism. In embodiments, the pantograph mechanism includes a first pair of arms having a first end and a second end, the first end pivotably coupled to the trunnion shaft and the second end slidably coupled to the fork carriage assembly. In embodiments, the pantograph mechanism includes a second pair of arms, having a first end and a second end, the first end slidably coupled to the mast carriage assembly and the second end pivotably coupled to the fork carriage assembly.

Also disclosed is a double reach pantograph assembly for use on a vehicle, such as a fork lift. In embodiments, the pantograph assembly includes a mast carriage assembly that has a trunnion cross-member and a trunnion shaft coupled to the trunnion cross-member. In embodiments, the pantograph assembly further includes a fork carriage assembly and a pantograph mechanism. In embodiments, the pantograph mechanism includes a first pair of inner arms having a first end and a second end, the first end pivotably coupled to the trunnion shaft. In embodiments, the pantograph mechanism includes a first pair of outer arms, having a first end and a second end, the first end slidably coupled to the mast carriage assembly. In embodiments, the pantograph mechanism includes a second pair of inner arms having a first end and a second end, the first end pivotably coupled to the second end of the first pair of outer arms and the second end slidably coupled to the fork carriage assembly. In embodiments, the pantograph mechanism includes a second pair of outer arms, having a first end and a second end, the first end pivotably coupled to the second end of the first pair of inner arms and the second end pivotably coupled to the fork carriage assembly.

BRIEF DESCRIPTION OF THE DRAWINGS

Embodiments will be readily understood by the following detailed description in conjunction with the accompanying drawings. Embodiments are illustrated by way of example and not by way of limitation in the figures of the accompanying drawings.

DETAILED DESCRIPTION OF DISCLOSED EMBODIMENTS

Figure 1:
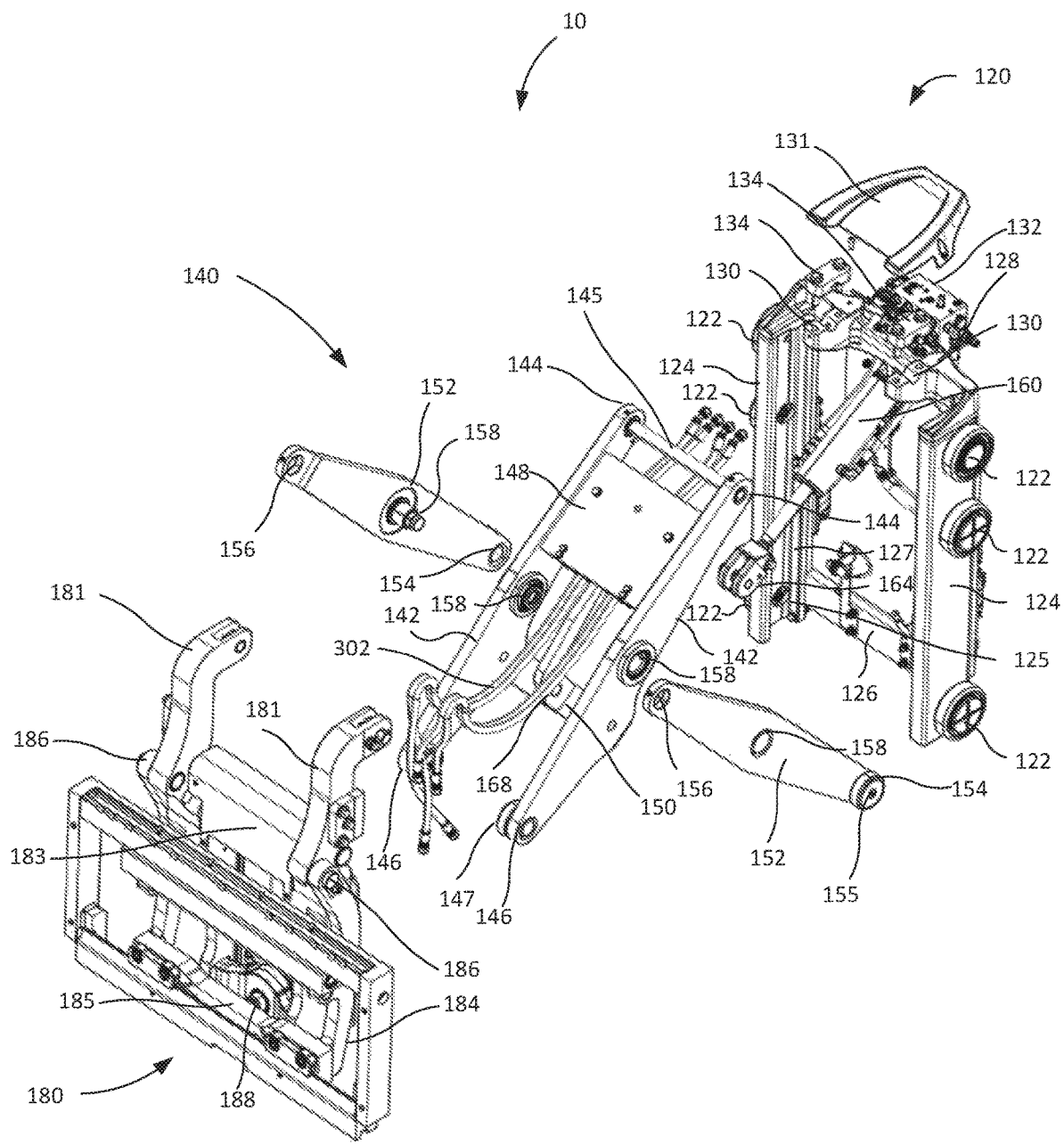
FIG. 1 is a front left exploded isometric view illustrating an example pantograph assembly with the pantograph mechanism in an extended position.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of the invention is defined by the appended claims.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous.

The present disclosure relates to a pantograph assembly for use on vehicle, such as a lift vehicle. As disclosed herein the pantograph assembly can be discussed as three different parts that are coupled together to form the pantograph assembly, namely the mast carriage assembly, the pantograph mechanism, and the fork carriage assembly. Thus, in various embodiments, a pantograph assembly includes a mast carriage assembly that is capable of being coupled to a mast of a lift vehicle. Movement of the mast carriage assembly relative to the mast moves the pantograph assembly upwards and downwards relative to the lift vehicle. Typically, hydraulic systems are provided on the mast and/or lift vehicle to provide lift for the mast carriage assembly. In embodiments, the mast carriage assembly includes a trunnion cross-member and a trunnion shaft that is coupled to the trunnion cross-member. In embodiments, the trunnion shaft is used and/or configured to couple the pantograph mechanism to the carriage assembly. In embodiments, the mast carriage assembly includes two spaced apart vertical mast carriage supports having a top end and a bottom end that are coupled at their respective tops to the trunnion cross member. In embodiments, the trunnion cross-member and the trunnion shaft both run transverse to the front to back axis of a lift vehicle, with the front being considered the portion of the vehicle adapted for forks and the rear of the vehicle the portion where the operator would typically be located. In various embodiments, a mast carriage assembly includes a plurality of rollers, for example coupled to exterior faces or sides of the vertical mast carriage supports. The rollers are configured to fit within guides or channels of the mast and facilitate vertical movement of the mast carriage assembly and hence the pantograph assembly with respect to the remainder of the lift vehicle.

In embodiments, the pantograph assembly includes a primary hydraulic integrated circuit coupled to a rear side of the trunnion cross-member. By mounting the primary hydraulic integrated circuit on the reward facing (toward the lift vehicle) side of the trunnion cross member operator visibility is increased and mast carriage assembly height is decreased which are desirable attributes for a lift vehicle. Increasing operator visibility may increase productivity, that is, an operator who can see better may be able to work more efficiently. Furthermore, the placement of the primary hydraulic integrated circuit in this position allows for easy access, for example greatly increasing the efficiency of maintenance and inspection. In certain embodiments, the pantograph assembly includes a set of nylon shrink wrapped hydraulic hoses. These hoses may resist wear and thus may require less maintenance and routing hardware compared to current pantograph assemblies, both of which decrease associated costs. In certain embodiments, the set of nylon shrink wrapped hydraulic hoses includes a plurality of hydraulic hoses bundled together with a shrink wrap sheath, for example, pairs of hoses bundled together. Coupling the hoses in pairs, or more, may reduce the propensity of the hoses to bend off axis, that is, such wrapping may facilitate maintaining the hose layout configuration as the pantograph extends and retracts. In other embodiments, the pantograph assembly may include a secondary hydraulic integrated circuit, and possibly additional hydraulic circuits depending upon the specific requirements of a given implementation.

As disclosed herein, the pantograph assembly includes a pantograph mechanism. In embodiments, the pantograph mechanism includes a first pair of arms, which in some examples are inner arms. In embodiments, the first pair of arms have a first end and a second end, where the first end is pivotably coupled to the trunnion shaft and the second end is slidably coupled to the fork carriage assembly. In embodiments, the first pair of arms includes a slider at the second end, and the slider is received in a guide channel in the fork carriage assembly. In embodiments, the pantograph mechanism includes a second pair of arms, which in some examples are outer arms. In embodiments, the second pair of arms have a first end and a second end, where the first end is slidably coupled to the mast carriage assembly and the second end is pivotably coupled to the fork carriage assembly. In embodiments, the second pair of arms include a slider at the first end, and the slider is received in a guide channel in the vertical mast carriage support.

In embodiments, the guide channel in the vertical mast carriage support includes an optional removable and/or replaceable, for example, exchangeable, wear plate. The optional wear plate is meant to take the pressure and thus wear associated with the sliders, and in particular when the pantograph assembly is being actuated under load. By including a wear plate that can be replaced the life of the vertical mast carriage support can be substantially extended. In embodiments, the guide channel is generally C-shaped (when looking down the channel) and includes a back edge and a front edge. In embodiments, a wear plate may be reversibly coupled to the back edge of the guide channel, for example, with fasteners, a wear plate may be reversibly coupled to the front edge of the guide channel, or a wear plate may be reversibly coupled to the back edge of the guide channel and to the front edge of the guide channel. In embodiments, the wear plate only extends partially up the guide channel where the sliders would be in contact during movement.

In embodiments, the guide channel in the fork carriage assembly is substantially linear and has a centerline vertically inline with a centerline of the upper pivot point of the fork carriage frame where the second ends of the second pair of arms is pivotably coupled. In embodiments, each one of the first pair of spaced apart arms is pivotably coupled to one of the second pair of spaced apart arms. In embodiments, each of the first pair of arms is positioned laterally inwardly from the respective second pair of arms. By scissoring the pantograph mechanism, the mechanism can be extended or retracted, for example with a hydraulic system coupled to the pantograph assembly, thus giving the pantograph assembly the ability to reach. In embodiments, the first pair of arms includes at least one cross-member extending laterally between and coupled to the first pair of arms. In embodiments, the pair of first arms is structurally coupled together by the at least one cross-member disposed between the pair of first arms. In embodiments, the at least one cross-member provides both mounting surfaces and structural reinforcement for the pantograph extension mechanism. In embodiments, the pantograph extension mechanism further includes a hydraulic ram that is pivotably coupled at a first end to the trunnion cross member and pivotably coupled at a second end to the at least one cross-member.

In embodiments, the trunnion cross-member includes a trunnion cradle for receiving the trunnion shaft therein. For example, the trunnion cross-member may have one centrally located trunnion cradle, or two trunnion cradles laterally spaced apart for receiving and/or holding the trunnion shaft. In certain embodiments, a trunnion cradle includes a location bore configured to accept a trunnion shaft location pin. In embodiments, the location bore is substantially transverse to a long axis of the trunnion shaft, which itself runs transverse to the front to back axis of the lift vehicle. While a location bore that is substantially transverse to a long axis of the trunnion shaft is preferred, it is contemplated that this bore could be angled with respect to the trunnion shaft. In embodiments, the pantograph assembly further includes a trunnion shaft location pin. In embodiments, the trunnion shaft is notched to allow for placement of the trunnion shaft location pin in the notch. In embodiments, the location bore passes through the bottom of the trunnion cradle such that a location pin placed in the location bore would protrude into a bore of the trunnion cradle. Placement of the location pin in the notch of the trunnion shaft while the location pin is inserted constrains lateral and rotational motion of the trunnion shaft with respect to the trunnion cross-member, for example.

In various embodiments, the pantograph assembly further includes an adjustable trunnion cap (preferably, one for each trunnion cradle) that is configured to couple the trunnion shaft to the trunnion cross-member, for example by aligning with a trunnion cradle. In embodiments, the trunnion cap, together with the trunnion cradle, forms a bore, such as a line bore, for receiving the trunnion shaft. A trunnion cap may be elongate such that it spans the width of the trunnion shaft and can be tightened to the trunnion cross member. The inventors have found that inclusion of adjustability in the trunnion cap leads to a pantograph assembly that is easier to assemble, is not prone to binding due to uneven weight distribution, and is generally easier to service. In certain embodiments, an adjustable trunnion cap includes two ovoid through bores at either end configured to receive a fastener, wherein the ovoid through bores are oversized for the fastener, thus allowing the adjustable trunnion cap to move as the fasteners are tightened. In certain embodiments, the trunnion shaft location pin is retained by at least one fastener coupling the adjustable trunnion cap to the trunnion cross-member. In embodiments, the trunnion cap includes a clearance between the underside (semicircular portion) of the trunnion cap and the trunnion shaft, such that the fasteners that are used to secure the trunnion cap and trunnion shaft are not loaded in shear when the pantograph mechanism is under load. The present inventors discovered that this configuration improves the durability of the joint. In certain embodiments, the location bore runs from the front of the trunnion cross-member at least partially toward the back, in other words it is not a through bore but passes through a bore for at least one of the fasteners used to tighten a trunnion cap, typically one located toward the front of the trunnion cross-member. In examples, the trunnion shaft location pin fits within the location bore and behind a tightened fastener used to tighten a trunnion cap such that insertion of the fastener holds the locator pin in place.

In various embodiments, the pantograph assembly further includes a fork carriage assembly to which forks of a lift vehicle, such as a forklift, can be coupled, hung, or otherwise attached. In embodiments, the fork carriage assembly includes a fork tilting assembly. In embodiments, the fork tilting assembly includes a fork carriage frame, a fork tilt cross-member, and a pair of lateral spaced apart tilt arms. The pair of lateral spaced apart tilt arms have an upper and a lower end where the upper end is pivotably coupled to the fork carriage frame and the lower end is coupled to the tilt cross-member. In embodiments, the fork tilting assembly includes a tilt hydraulic ram coupled at a rear end to the fork carriage frame and coupled at a front end to the tilt cross-member. Actuation of the tilt hydraulic ram pushes the tilt cross-member causing the fork tilting assembly to tilt.

Also disclosed is a multiple reach pantograph assembly, for example a double reach pantograph assembly. Multiple reach pantographs assemblies are particularly useful in double-deep racking application, and in particular to reach the back rows of such stacks. As with the previously described embodiments, the pantograph assembly according to such embodiments includes a mast carriage assembly and a fork carriage assembly. The main difference between a single reach pantograph assembly as described above and a multiple reach pantograph assembly is the inclusion of additional sets of arms to the multiple reach pantograph mechanism. Generally speaking, a double pantograph extension mechanism incudes a first pair of laterally spaced apart inner arms having first ends that are pivotably coupled the to the mast carriage assembly. Each of the first pair of inner arms has a second end. The double pantograph extension mechanism further includes a first pair of laterally spaced outer arms having first ends slidably coupled to the guide channels or tracks of the vertical mast carriage supports as described above. Each of the first pair of outer arms has a second end. The double pantograph extension mechanism incudes a second pair of laterally spaced apart inner arms having first ends that are pivotably coupled to the second ends of the first pair of outer arms. Each of the second pair of laterally spaced apart inner arms has a second end that includes a slider that travels in a corresponding track formed on the fork carriage assembly as described above. The double pantograph extension mechanism further includes a second pair of laterally spaced outer arms having first ends pivotably coupled to the second ends of the first pair of inner arms. Each of the second pair of laterally spaced apart outer arms has a second end pivotably coupled to the fork carriage assembly. By coupling multiple sets of inner and out arms together as described multiple reach pantograph assemblies can be built, for example, a third pair of inner arms and a third pair of outer arms may be included.

Turning to the figures various aspects of a pantograph assembly for a lift vehicle and various components and features of the pantograph assembly will be described.

With reference to FIGS. 1-7, the pantograph assembly 10 includes a mast carriage assembly 120, a pantograph mechanism 140, and a fork carriage assembly 180. The mast carriage assembly 120 is configured to be coupled to the mast portion of a lift vehicle for vertical movement along the mast. Movement of the mast carriage assembly 120 relative to the mast (not shown) moves the pantograph assembly 10 upwards and downwards relative to the lift vehicle, and typically the floor that the lift vehicle is resting on. Hydraulic systems on the mast and/or lift vehicle, described below, lift the mast carriage assembly 120, and hence the pantograph mechanism 140 and fork carriage assembly 180, based on input from an operator.

With continued reference to FIGS. 1-7, the mast carriage assembly 120 includes two facing vertical mast carriage supports 124 that are spaced apart and run substantially parallel to each other. As best seen in FIG. 1, the vertical mast carriage supports 124 are generally C-shaped in cross section with the facing sides of the vertical mast carriage supports 124 including guide channels or tracks 125, the purpose of which will become apparent. The vertical mast carriage supports 124 are coupled at their respective bottoms by a bottom cross member 126 and at the top by a trunnion cross member 128. The trunnion cross member 128 and features therein will be discussed at length below (see FIGS. 8-10 and accompanying text). Together, the vertical mast carriage supports 124, the bottom cross member 126, and the trunnion cross member 128 form a rigid torsion box that provides pivot points and guide channels 125 for the pantograph mechanism 140. Located on the exterior or sides of the vertical mast carriage supports 124 that face away from each other are a plurality of rollers 122. The rollers 122 are configured to fit within guide channels or tracks of the mast (not shown) and facilitate vertical movement of mast carriage assembly 120 with respect to the mast of the lift vehicle.

Figure 7:
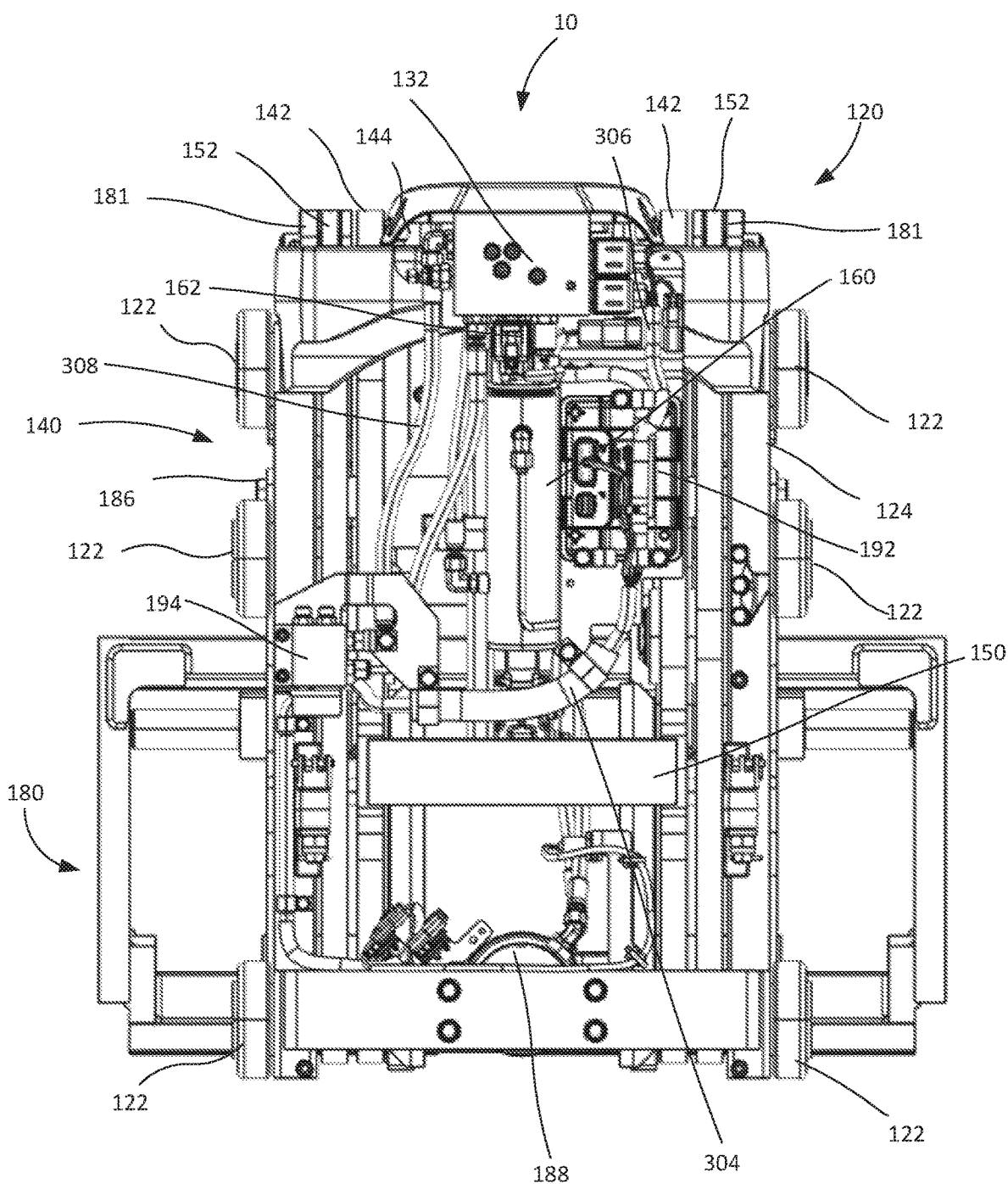
FIG. 7 is a rear view (looking forward from an operator's perspective) illustrating the example pantograph assembly with the pantograph mechanism in a fully retracted position.

As shown in FIG. 1 the trunnion cross member 128 is multifunctional in that it provides rigidity to the mast carriage assembly 120, trunnion cradles 130 for mounting the pantograph mechanism 140, and a location to mount hydraulic integrated circuit 132. By mounting the hydraulic integrated circuit 132 on the rearward facing or back (toward the lift vehicle) side of the mast carriage assembly 120, and specifically trunnion cross member 128, operator visibility is increased, when compared to existing pantograph designs. In addition, the placement of the hydraulic integrated circuit 132 in this position allows for easy access, for example, greatly increasing the efficiency of maintenance and inspection. As best shown in FIG. 7, an electronic controller 192 and a hydraulic junction 194 are coupled to the mast carriage assembly 120 back side. Placement of such components on the back side of mast carriage assembly 120, for example, in the locations shown or other suitable locations, provides for ease of inspection and servicing without removing the mast carriage assembly 120 from the mast.

Figure 2:
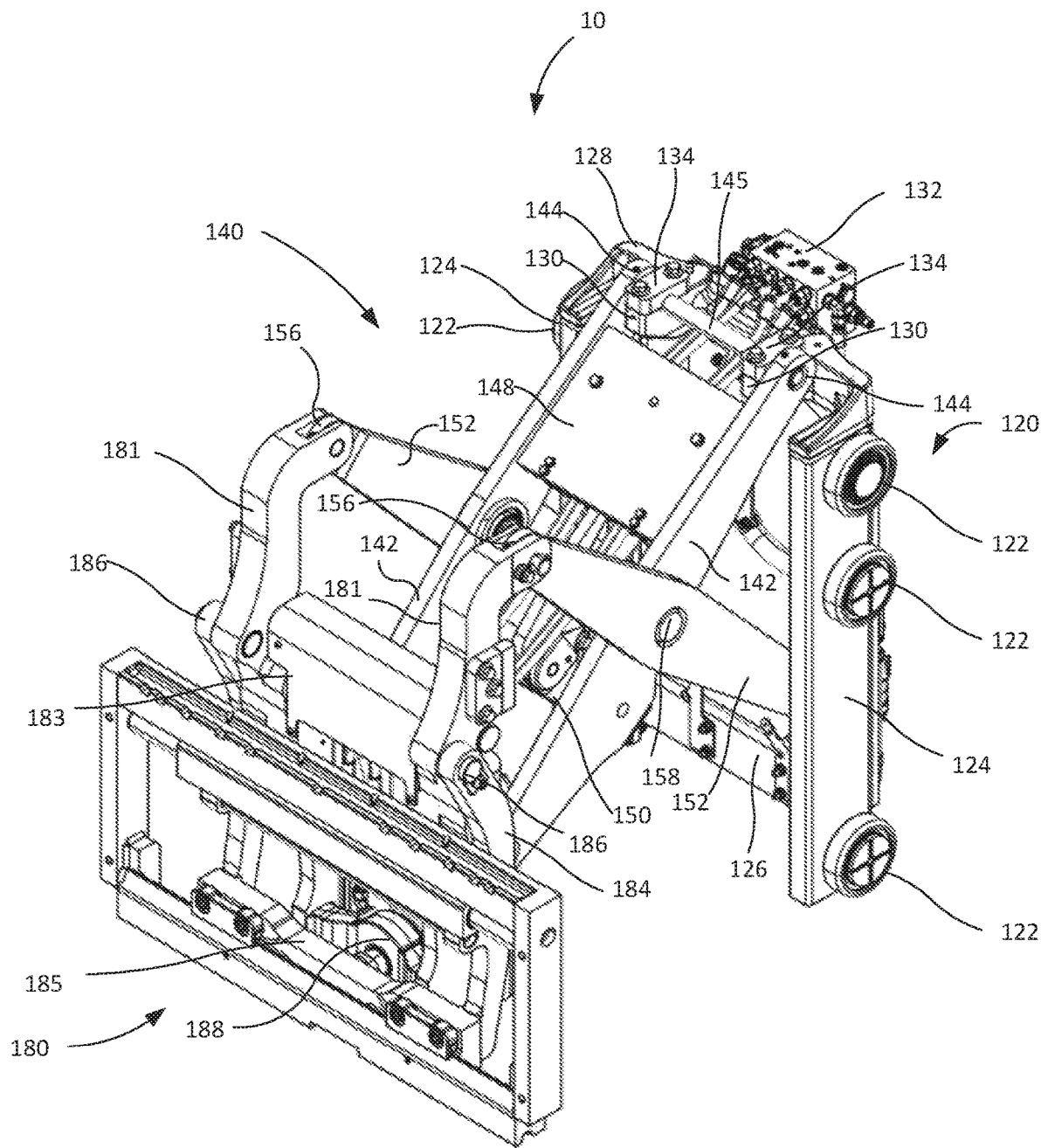
FIG. 2 is a front left isometric view illustrating the example pantograph assembly of FIG. 1 with the pantograph mechanism in an extended position.
Figure 3:
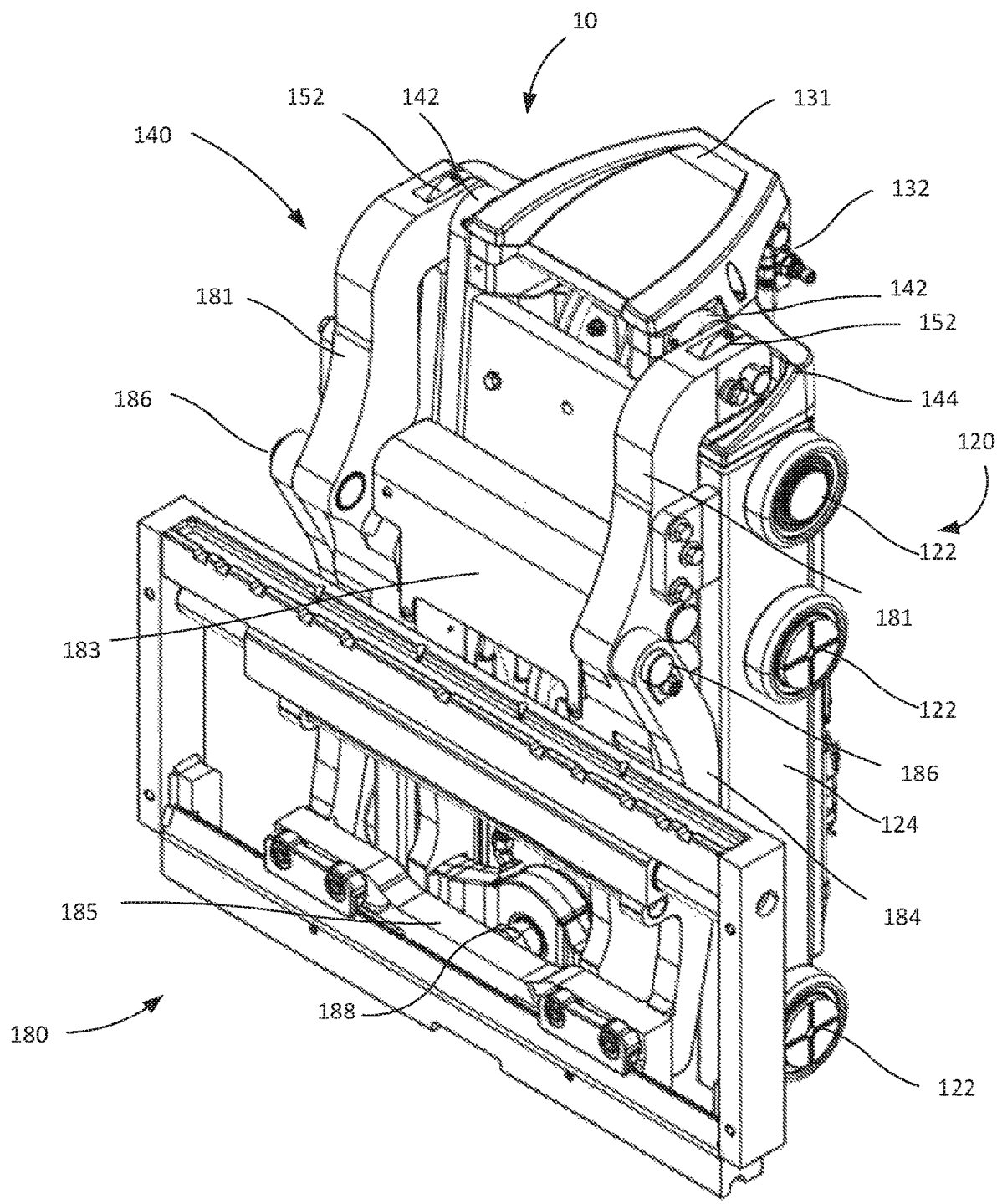
FIG. 3 is a front left isometric view illustrating the example pantograph assembly of FIG. 1 with the pantograph mechanism in a fully retracted position.

With continued reference to FIGS. 1-7, the pantograph assembly 10 further includes a pantograph mechanism 140 for effecting horizontal movement of the fork carriage assembly 180 relative to the mast carriage assembly 120. For example, the fork carriage assembly 180 is positionable in a fully retracted position as shown in FIG. 3 an extended position as shown in FIG. 2, or in any intermediate position between the fully refracted and extended positions as desired by the operator. The pantograph mechanism 140 incudes a first pair of laterally spaced apart inner arms 142 having first ends 144 that are pivotably mounted to a trunnion shaft 145. The trunnion shaft 145 is mounted to the mast carriage assembly 120 in trunnion cradles 130 of the trunnion cross member 128. One purpose of the trunnion cross member 128 is to comprise suitable structure for receiving and retaining a trunnion shaft 145. While trunnion cradles 130 are illustrated, a single, centrally-located trunnion cradle, or other suitable attachment structure, may be used to mount the pantograph mechanism 140 via a trunnion shaft 145 to the trunnion cross member 128. The trunnion shaft 145 is held in the trunnion cradles 130 with adjustable trunnion caps 134.

The first pair of inner arms 142 have second ends 146 that that are slidably coupled to the fork carriage assembly 180 with sliders 147. As best seen in FIG. 1, the first pair of inner arms 142 include a first cross-member 148 extending laterally between and coupled to the first pair of inner arms 142 and a second cross-member 150 that extends laterally between and coupled to the first pair of inner arms 142. The second cross-member 150 is spaced apart from the first cross-member 148. The first cross-member 148 and the second cross-member 150 provide both mounting surfaces and structural reinforcement for the pantograph mechanism 140.

The pantograph mechanism 140 further includes a second pair of laterally spaced apart, or outer, arms 152 having first ends 154 slidably coupled to the guide channels or tracks 125 of the vertical mast carriage supports 124 of the mast carriage assembly 120 with sliders 155. The sliders 155 slide within the guide channels or tracks 125 of the vertical mast carriage supports 124. The guide channels 125 include optional wear plates 127, which are discussed later with respect to FIG. 11. The slider 155 may be round and may able to rotate, for example as a roller. Other shapes, such as square and/or rotational fixed sliders are also contemplated. Each of the second pair of laterally spaced apart outer arms 152 has a second end 156 pivotably coupled to vertical supports 181 of the fork carriage assembly 180. The centerline sliders 155 and/or the guide channels or tracks 125 are in vertical alignment with the centerline of the trunnion shaft 145. The first pair of laterally spaced inner arms 142 is pivotably connected to the second pair of laterally spaced outer arms 152 at their respective midpoints 158, within suitable tolerances. The pantograph mechanism 140 further includes a hydraulic ram 160 that is pivotably coupled at a first end 162 (best seen in FIGS. 4 and 7) to the trunnion cross member 128 and pivotably coupled at a second end 164 to the second cross member 150 at pivot point 168.

Figure 4:
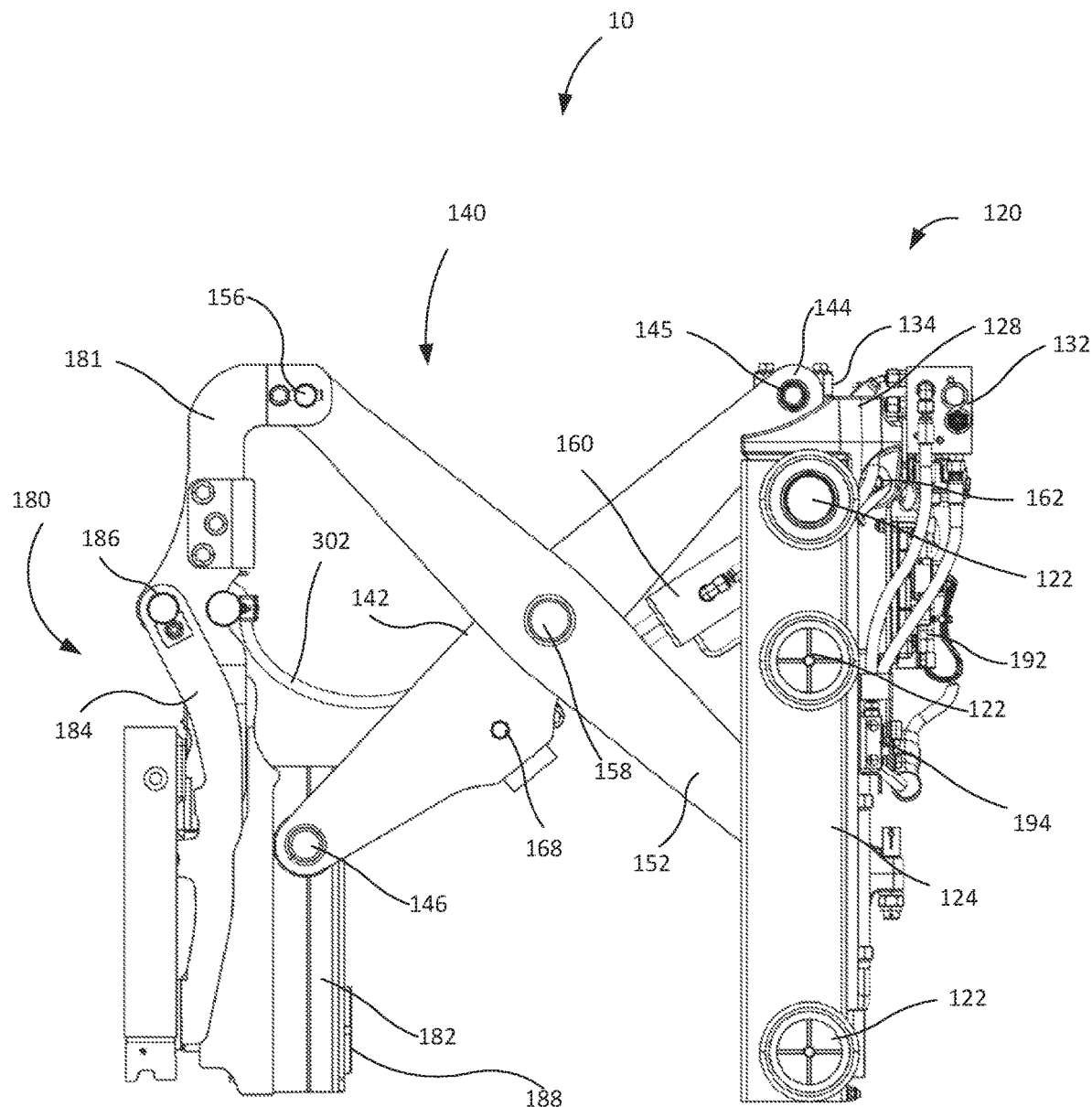
FIG. 4 is a left side view illustrating the example pantograph assembly of FIG. 1 with the pantograph mechanism in an extended position.
Figure 5:
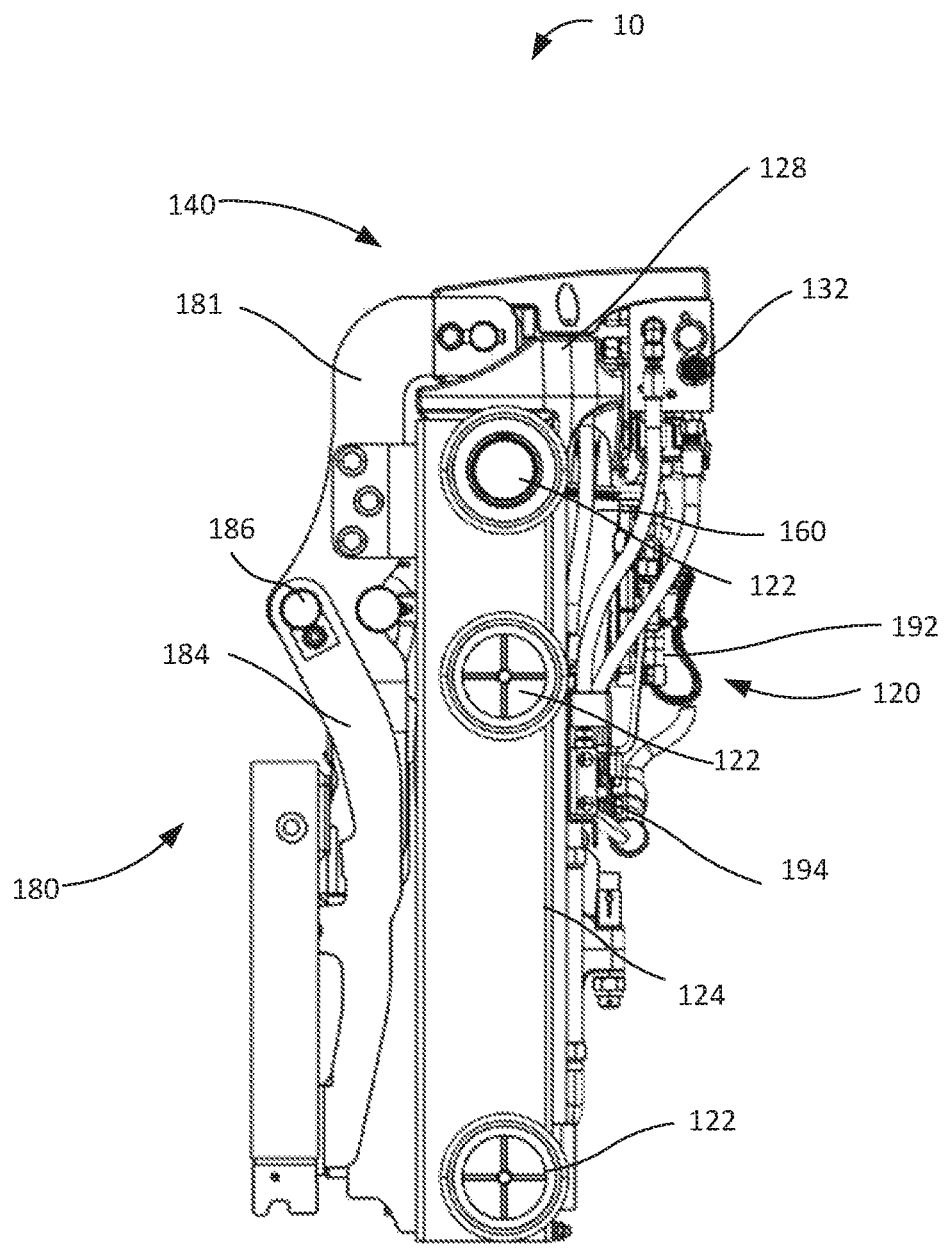
FIG. 5 is a left side view illustrating the example pantograph assembly of FIG. 1 with the pantograph mechanism in a fully retracted position.
Figure 6:
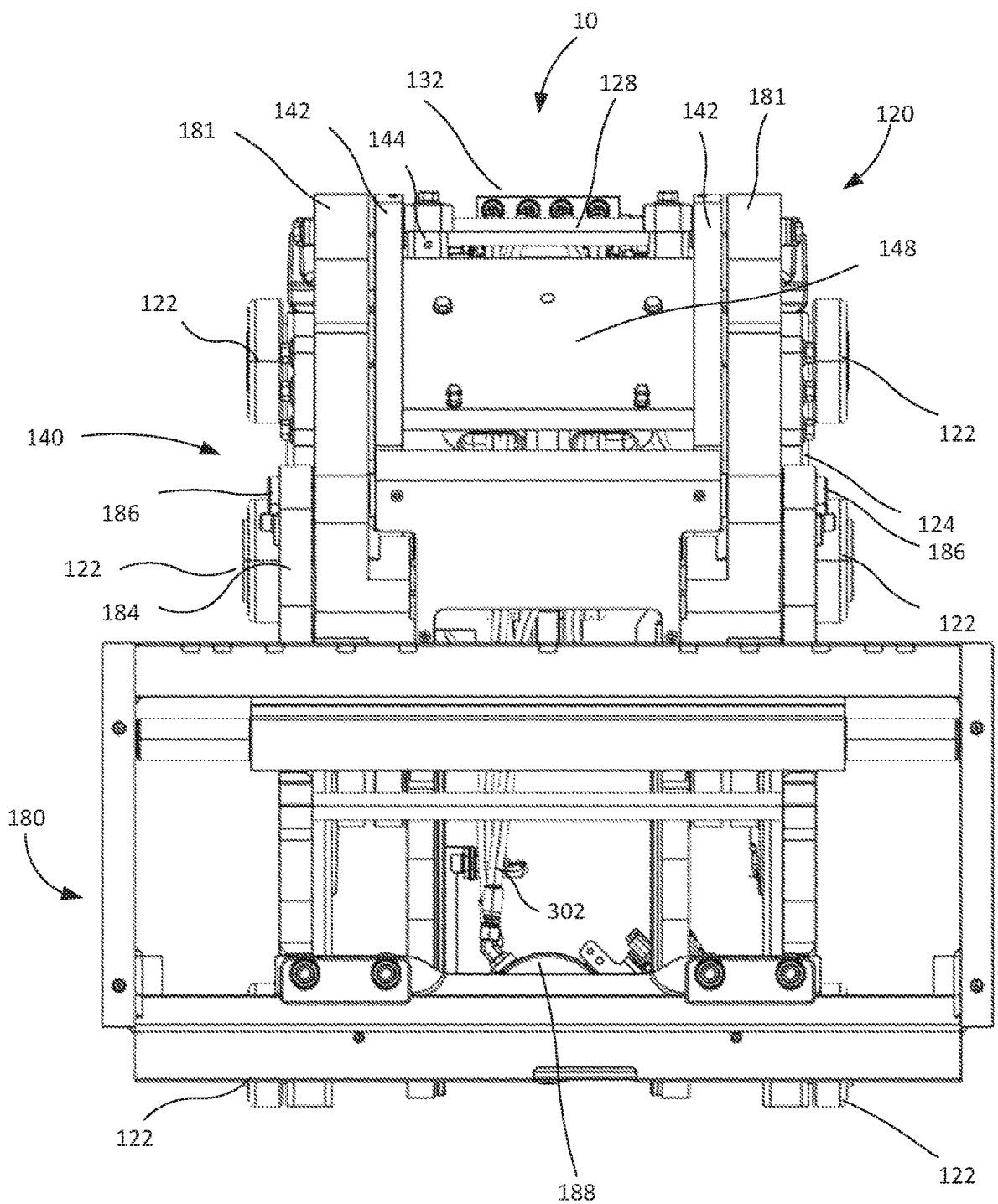
FIG. 6 is a front view (looking back towards the operator) illustrating the example pantograph assembly of FIG. 1 with the pantograph mechanism in a fully retracted position.

As best shown in FIGS. 1 and 4 the second ends 146 of the first pair of laterally spaced inner arms 142 each include a slider 147 that travels in a corresponding first track 182 formed on the fork carriage assembly 180. The sliders 147 may be round and may be rotatable, for example, as a roller. Other shapes, such as square and/or rotationally fixed sliders are also contemplated. The track 182 is generally straight and runs vertically and the centerline of the sliders 147 and/or guide channels or tracks 182 is in vertical alignment with the pivotal connection of the second ends 156 of the second pair of laterally spaced apart outer arms 152 and of the vertical support 181 of the fork carriage assembly 180.

This inline geometry allows the fork carriage assembly 180 to remain relatively level as the pantograph mechanism 140 is extended and/or retracted.

The pantograph assembly 10 further includes a fork carriage assembly 180, which is configured to couple to forks or other suitable implement (for example a barrel handler) for lifting and/or moving various goods, including palletized goods. With reference to FIG. 1, the fork carriage assembly 180 includes fork tilting assembly 184, which at one end is pivotably attached to the vertical supports 181 of the fork carriage assembly 180 at pivot points 186. The two vertical supports 181 are coupled by an upper cross member 183, which extends between the vertical supports 181. At the second end, the fork tilting assembly 184 is coupled to a tilting hydraulic unit 188 with a cross-member 185. Actuation of the tilting hydraulic unit 188 by an operator allows the fork tilting assembly 184 to be actively tilted from vertical (forwards or backwards) which may be useful in guiding, picking up, or placing a load.

As may be seen in the FIGS. 1-7, the hydraulic integrated circuit 132 is coupled to one or more hydraulically powered mechanisms fitted to various components of the pantograph assembly 10. For example, the fork tilting assembly 184, as described above, is coupled to tilting hydraulic unit 188, via one or more hydraulic hoses 302. The hydraulic integrated circuit 132 is further coupled to the pantograph extension mechanism, to allow the pantograph mechanism 140 to be selectively extended or retracted. Specifically, hydraulic integrated circuit 132 is coupled to hydraulic ram 160, by one or more hydraulic hoses (not shown), which may be similar in construction to hydraulic hoses 302. As described above, hydraulic ram 160 is pivotably coupled to second cross member 150. As hydraulic ram 160 extends in length, it imparts a force to second cross member 150, biasing it away from mast carriage assembly 120, and causing pantograph mechanism 140 to extend. Similarly, as hydraulic ram 160 retracts in length, it biases second cross member 150 towards mast carriage assembly 120, thus causing pantograph mechanism 140 to retract. Further, as may be seen in FIG. 7, hydraulic integrated circuit 132 may be coupled to hydraulic junction 194 in various embodiments, such as via hoses 308, for transmission of hydraulic fluid from a central pump or reservoir (not shown). Hydraulic junction 194 may be employed to avoid an unacceptably sharp bend to the hydraulic hoses that would otherwise be subject to excessive wear or create a point of failure in the hoses. Other hydraulically powered mechanisms to operate various implementation-specific functions or accessories may also be connected to the hydraulic integrated circuit 132.

The placement of hydraulic integrated circuit 132 near the top of the mast carriage assembly 120 allows the hydraulic hoses 302 to be routed through the center of the pantograph mechanism 140, as seen in FIGS. 1 and 2. This routing can provide a relatively direct path to the coupled hydraulic components, which can improve efficiency, reduce hose wear, and save costs by not requiring unnecessarily long hoses.

In some embodiments, hydraulic integrated circuit 132 may act as a manifold, distributing pressurized hydraulic fluid to the various coupled hydraulic components. In particular, hydraulic integrated circuit 132 may act as a switching body, receiving pressurized fluid and selectively supplying it to the hydraulic components as commanded by electronic controller 192. Hydraulic junction 194, in addition to acting to position coupled hydraulic hoses for proper routing, may also provide a point for electronic controller 192 to monitor various parameters of the hydraulic fluid, e.g. temperature, flow, pressure, condition, contaminant levels, etc. In some embodiments, hydraulic junction may offer selective switching of hydraulic fluid, or may divert the flow of hydraulic fluid back to the supply (e.g. the vehicle), to allow hydraulic integrated circuit 132 to be depressurized, such as if hydraulic integrated circuit 132 requires servicing, or for deactivation of any hydraulic components coupled to the pantograph assembly 10.

Furthermore, electronic controller 192 may be coupled to hydraulic integrated circuit 132, hydraulic junction 194, or both, such as with a wiring harnesses 304 and 306. As can be seen in FIG. 7, electronic controller 192 is electrically connected to hydraulic junction 194 with wiring harness 304, and to hydraulic integrated circuit 132 with wiring harness 306. Electronic controller 192 may include additional connections or terminals to allow subsequent adding and controlling of optional accessories or other components of or attached to the pantograph mechanism 10. Electronic controller 192 may perform various functions with hydraulic integrated circuit 132 and hydraulic junction 194, such as actuating the circuits to extend or retract the pantograph mechanism 140, tilting the fork tilting assembly 184, monitoring the condition of hydraulic fluid in hydraulic integrated circuit 132 and hydraulic junction 194, determining which hydraulic line is pressurized for selective actuation of one or more of coupled accessories described above (e.g. hydraulic ram, tilt functions, etc.), determining if a fault or malfunction has occurred, and/or performing other control and/or monitoring operations. Electronic controller 192, similar to hydraulic integrated circuit 132, may be secured at or near the top of the mast carriage assembly 120. Electronic controller 192 may be positioned on the back side, e.g. facing the vehicle 1400, of the mast carriage assembly 120. Specifically, electronic controller 192 may be coupled to the mast carriage assembly 120 just below the hydraulic integrated circuit 132, such as to the underside of trunnion cross member 128, or to the side of one of the vertical mast carriage supports 124. In other embodiments, the electronic controller 192 may be coupled to the top of trunnion cross member 128, proximate to the hydraulic integrated circuit 132, or in another place that facilitates ease of servicing of the electronic controller 192, similar to the positioning of the hydraulic integrated circuit 132.

Figure 8:
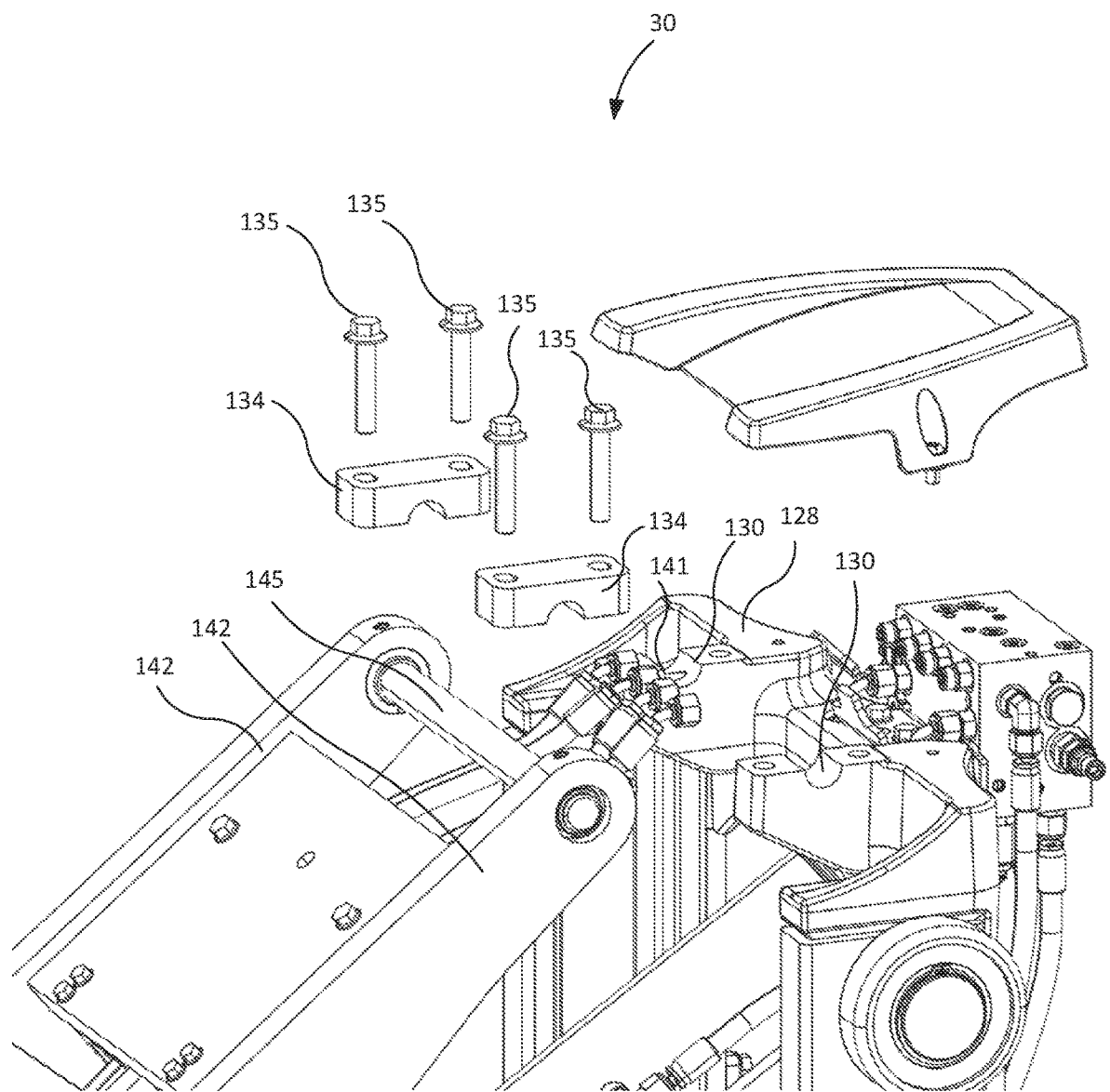
FIG. 8 is a close up exploded isometric view illustrating an example trunnion assembly of a pantograph assembly.
Figure 9A:
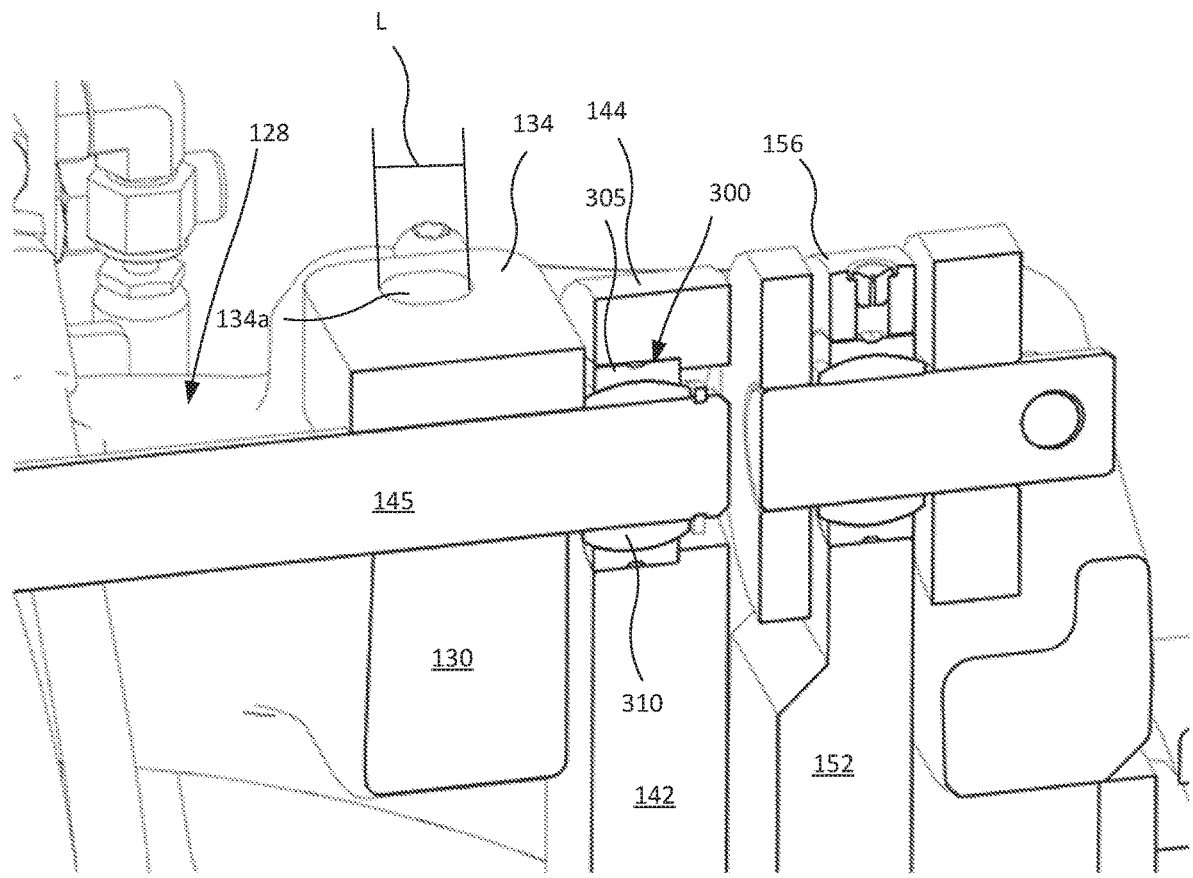
FIG. 9A is a cross-sectional view of the example trunnion assembly of FIG. 8.
Figure 9B:
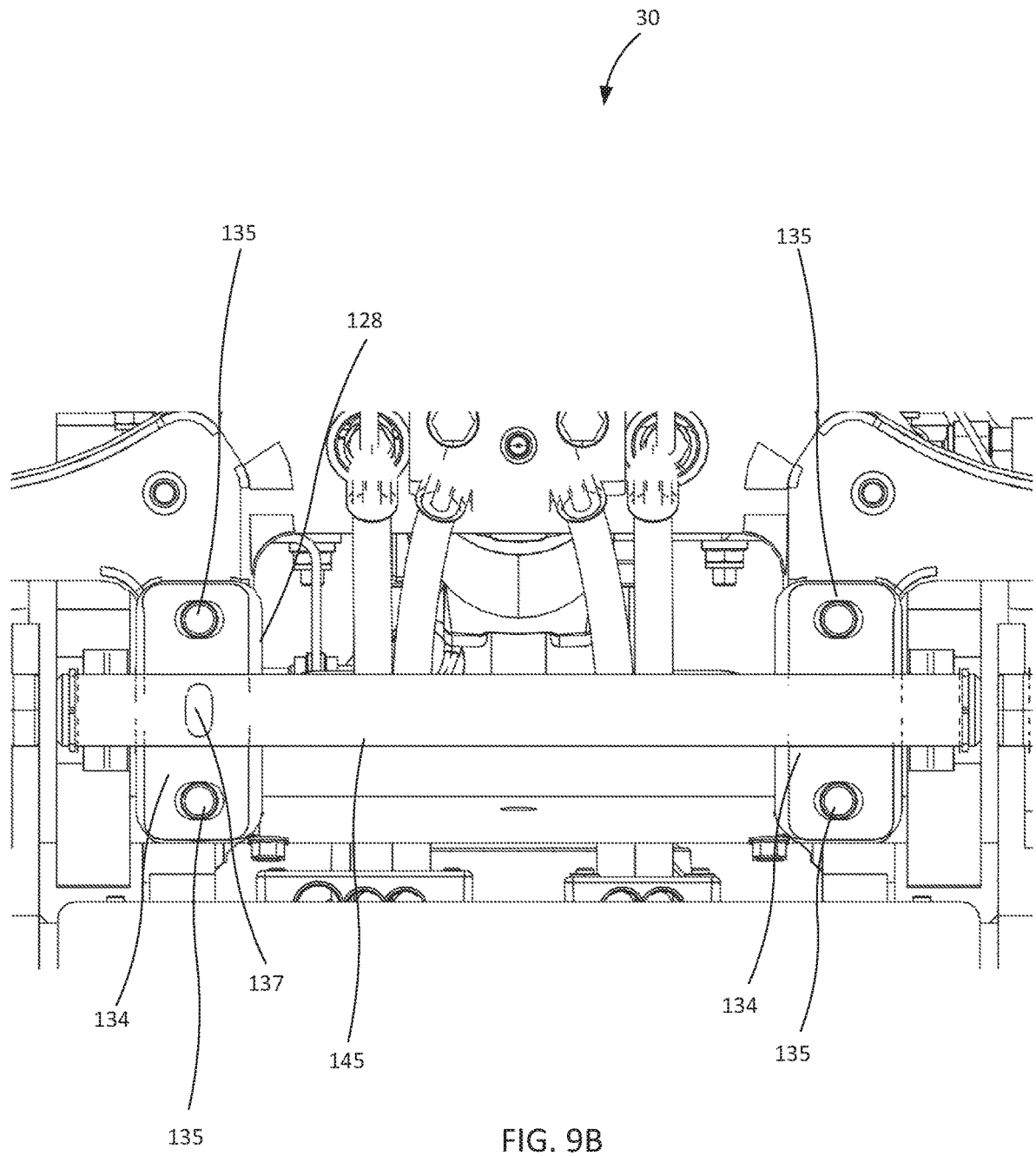
FIG. 9B is a top view illustrating components of the example trunnion assembly of FIG. 8.
Figure 10:
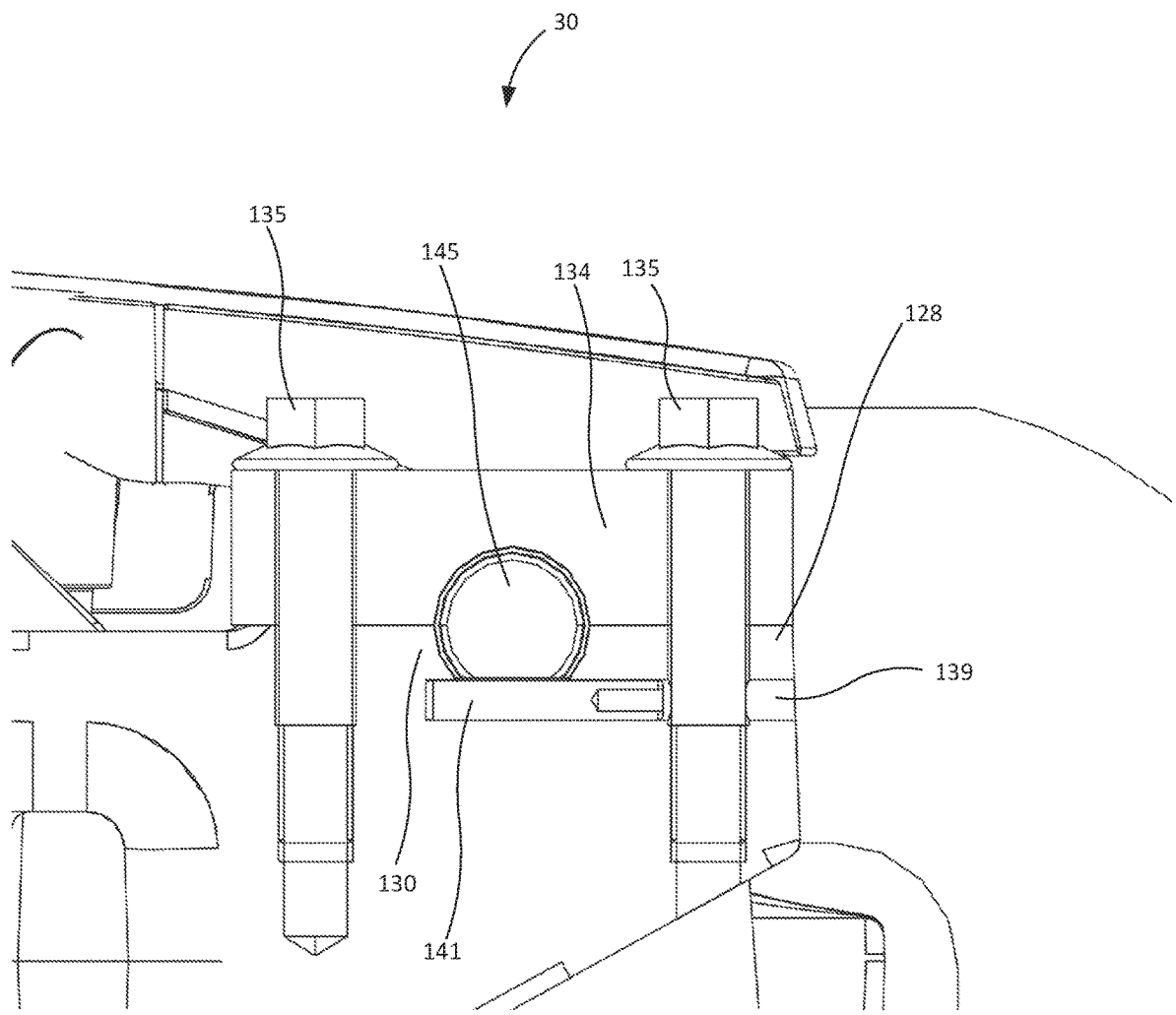
FIG. 10 is right cutaway view illustrating components of the example trunnion assembly of FIG. 8.

Turning now to FIGS. 8-10 aspects of an example trunnion assembly will be discussed. The trunnion assembly 30 includes the trunnion shaft 145, which is pivotably coupled to the first pair of first, or inner, arms 142. The trunnion assembly 30 further includes adjustable trunnion caps 134 which are coupled to the trunnion cross member 128 with fasteners 135. With reference to FIG. 8, the trunnion shaft 145 sits down and seats into the trunnion cradles 130.

With reference to FIG. 9A, the trunnion caps 134 are adjustable such that they can contact a bearing 300 (having an outer race 305 and an inner race 310) in an arm 142 (pivotally coupling the first end 144 of the arm 142 to the trunnion shaft 145) prior to, and after, tightening the fasteners 135. The holes 134a that pass through the trunnion caps 134 are ovoid and have a length L that is longer than the diameter of a fastener 135. Providing oversized holes 134a permits the trunnion cap 134 to be set on the trunnion cradle 130 and slid into position such that an edge of the trunnion cap 134 contacts the inner race 310 of bearing 300 without requiring precise alignment between two holes that are approximately the same size as a fastener 135. Therefore, tightening the fasteners 135 does not cause the trunnion caps 134 to shift from the position adjacent the inner race 310 of bearing 300. Contacting the trunnion caps 134 with the inner race 310 of bearing 300 inhibits side-to-side movement of the pantograph mechanism 140 with respect to the mast carriage assembly 120. For reference the second end 156 of outer arm 152 is shown in the fully retracted position.

With reference to FIG. 10, the present inventors discovered that allowing clearance, or movement, between the trunnion shaft 145 and the aperture formed when the trunnion cap 134 is secured to the trunnion cradle 130 provides a freer, that is, prone to less binding, trunnion assembly 30. Therefore, the trunnion assembly 30 includes sufficient clearance between some of the components such that the trunnion assembly 30 does not bind, for example, when loads on the pantograph assembly 10 are unevenly distributed side-to-side. Providing clearance between the trunnion shaft 145 and the aperture formed when the trunnion cap 134 is secured to the trunnion cradle 130, for example, 0.10 mm clearance, also permits the trunnion cap 134 to contact the trunnion cradle 130 such that the fasteners 135 may be tightened to create a clamping force along the junction of the trunnion shaft 145 and the trunnion cap 134. Such clamping and contact between the trunnion shaft 145 and the trunnion cap 134 inhibits imparting a shearing force on the fasteners 135 when the pantograph assembly 10 handles a load.

With reference to FIGS. 9B and 10, the trunnion shaft 145 includes one or more locator notches 137 that line up over the trunnion cradles 130. Keying the trunnion shaft 145 to a specific location with respect to the trunnion cradles 130 hinders side-to-side motion of the trunnion shaft 145. One option for keying the trunnion shaft 145 in a specific location incudes a trunnion location bore 139 in the trunnion cross member 128 that aligns with the locator notch 137 in the trunnion shaft 145, and a corresponding trunnion locator pin 141 received in the trunnion locator bore 139 and the locator notch 137 of the trunnion shaft 145. Once inserted, the trunnion locator pin 141 is held in place by one of the fasteners 135. The combination of the locator notch 137 and the locator pin 141 effectively keeps the trunnion shaft 145 from lateral movement and rotational movement.

Figure 11:
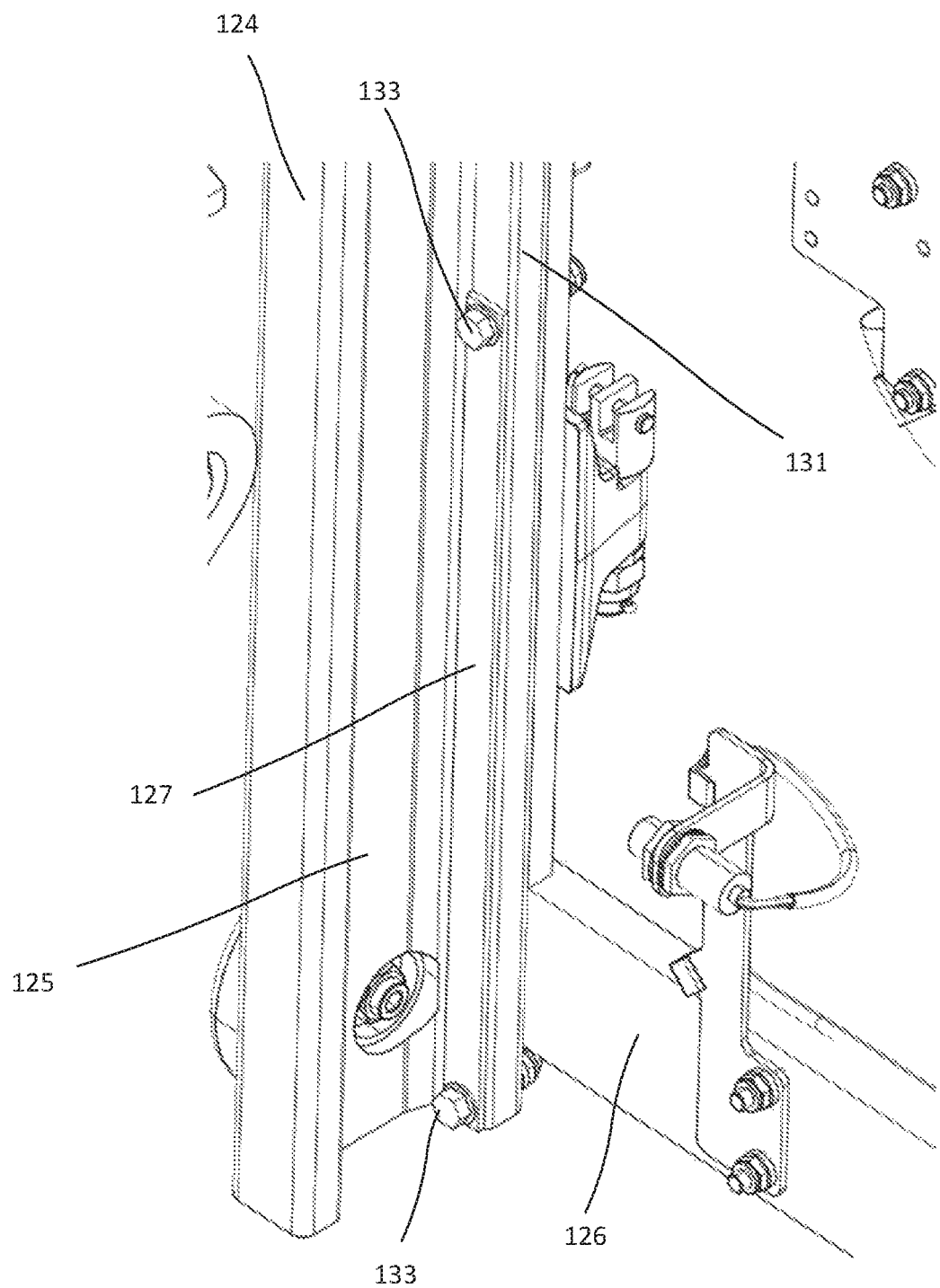
FIG. 11 is a close up isometric view illustrating an example wear plate for the pantograph assembly of FIG. 1.

Turning to FIG. 11 a single vertical mast carriage support 124 is shown. For reference the lower cross member 126 is shown. The vertical mast carriage support 124 includes the guide channel 125. The guide channel 125 is generally C-shaped (when looking down the channel) and includes a back edge 131. Releasably coupled to the back edge 131 of the vertical mast carriage support 124 is the optional wear plate 127. The wear plate 127 is configured to take the wear from the sliders (elements 155 in FIG. 1) as the pantograph mechanism is actuated from an extended position to a retracted position (and vice versa). The wear plate 127 is coupled to the back edge 131 of the vertical mast carriage support 124 with fasteners 133. The wear plate 127 only extends partially up the vertical mast carriage support 124 where the sliders 155 would be in contact during movement. Optionally, an additional wear plate 127 may be releasably coupled to the front edge of the guide channel 125. Wear plates 127 may also be included in the opposite guide channel 125.

Figure 12:
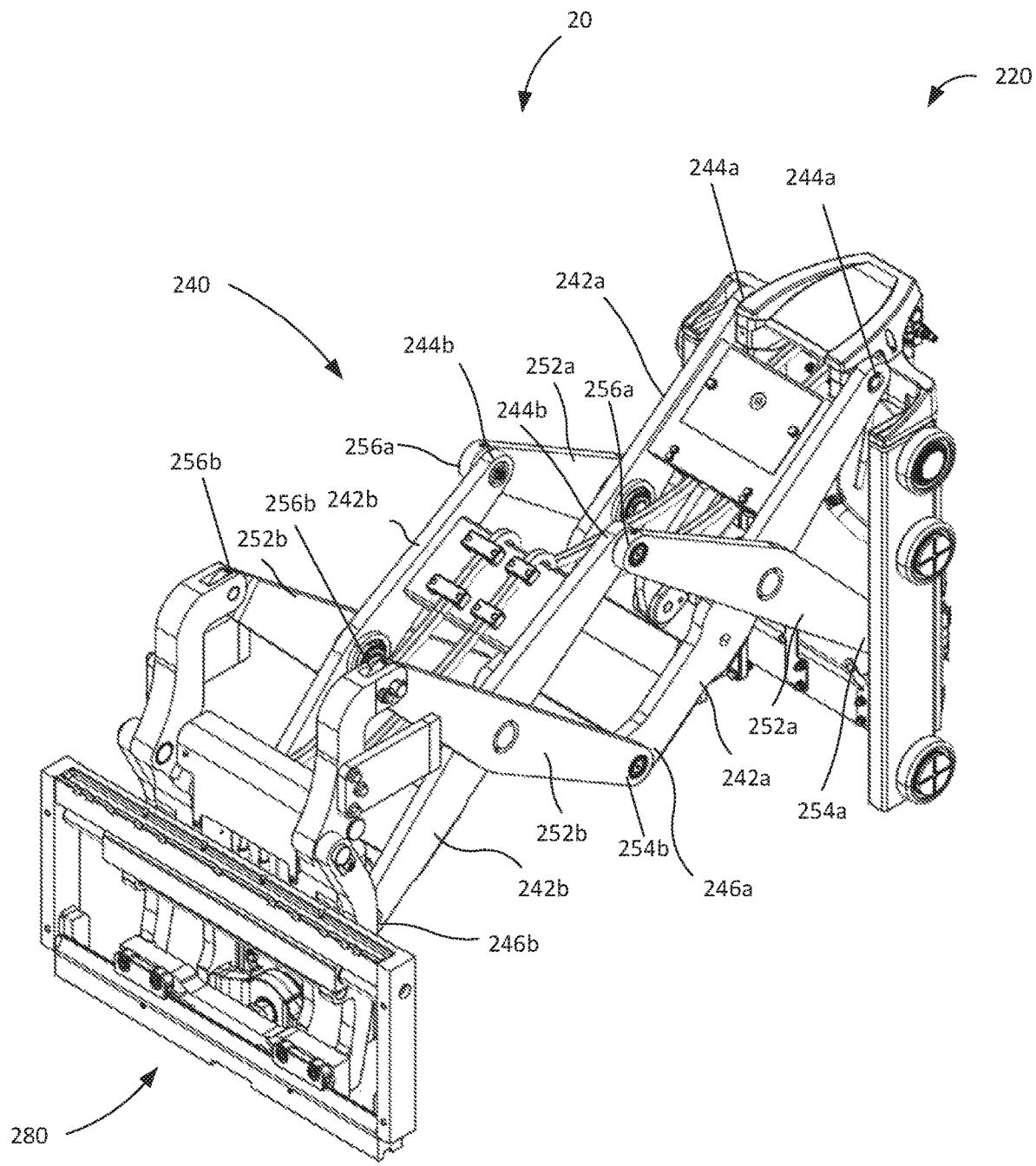
FIG. 12 is a left front isometric view illustrating an example double reach pantograph assembly with the pantograph mechanism in an extended position.
Figure 13:
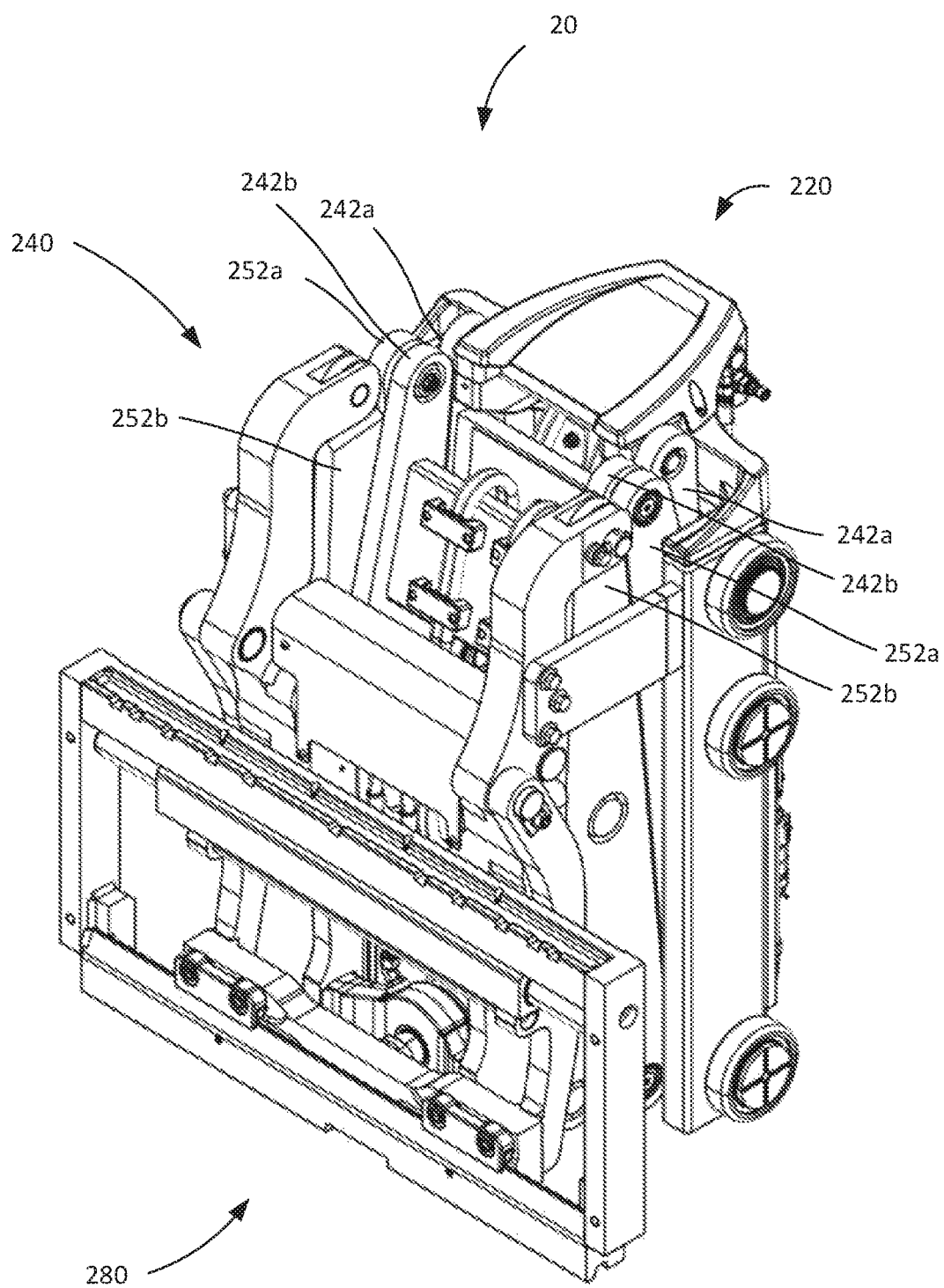
FIG. 13 is a left front isometric view illustrating the example double reach pantograph assembly of FIG. 12 with the pantograph mechanism in a fully retracted position.

Referring now to FIGS. 12 and 13, an example double reach pantograph assembly with the pantograph mechanism is shown. The pantograph assembly 20 illustrated in FIGS. 12 and 13 may be referred to as a double length pantograph assembly and may be used with a mast and/or lift truck as described above.

As with the previously described single reach pantograph, the pantograph assembly 20 according to this embodiment comprises a mast carriage assembly 220 coupled for vertical movement on a mast (not shown) of the truck, a fork carriage assembly 280, and a pantograph mechanism 240 for extension/retraction of the fork carriage assembly 280, to effect horizontal movement of the fork carriage assembly 280 relative to the mast carriage assembly 220. The general description of the mast carriage assembly and the fork carriage assembly are as described above with respect to FIGS. 1-7.

The pantograph mechanism 240 incudes a first pair of laterally spaced apart inner arms 242a having first ends 244a that are pivotably coupled the to the mast carriage assembly 220. Each of the first pair of inner arms 242a has a second end 246a. The pantograph extension mechanism 240 further includes a first pair of laterally spaced outer arms 252a having first ends 254a slidably coupled to the guide channels or tracks of the vertical mast carriage supports as described above with respect the similar features shown in FIGS. 1-7. Each of the first pair of outer arms 252a has a second end 256a. The pantograph extension mechanism 240 incudes a second pair of laterally spaced apart inner arms 242b having first ends 244b that are pivotably coupled to the second ends 256a of the first pair of outer arms 252a. Each of the second pair of laterally spaced apart inner arms 242b has a second end 246b that includes a slider 247 (not visible) that travels in a corresponding track formed on the fork carriage assembly 280, as described above with respect to FIGS. 1-7. The slider 247 may be round and may be able to rotate, for example as a roller. Other shapes, such as square and/or rotational fixed sliders are also contemplated. The pantograph extension mechanism 240 further includes a second pair of laterally spaced outer arms 252b having first ends 254b pivotably coupled to the second ends 246a of the first pair of inner arms 242a. Each of the second pair of laterally spaced apart outer arms 252 has a second end 256b pivotably coupled to the fork carriage assembly 280.

Figure 14:
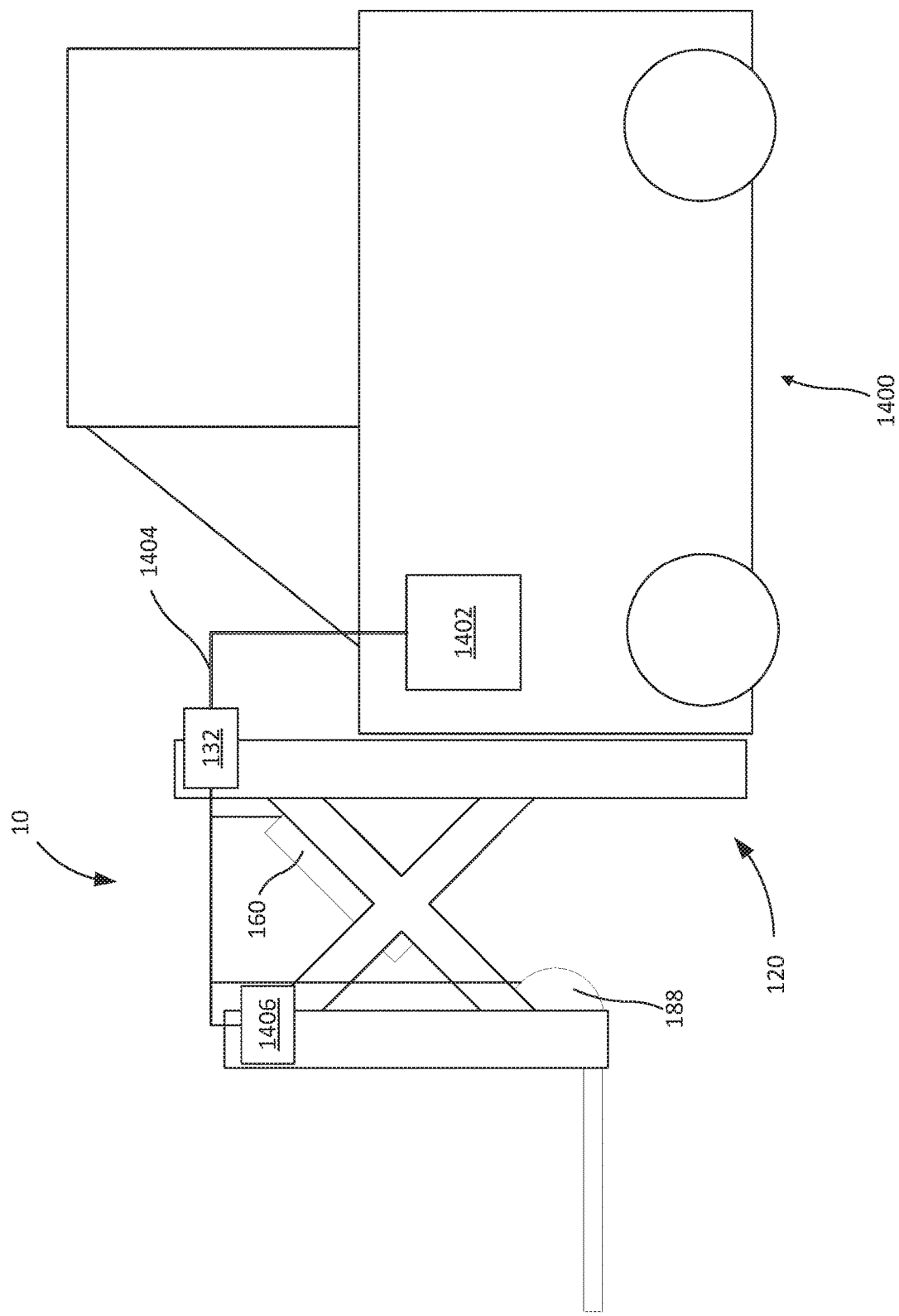
FIG. 14 is a side elevation simplified view illustrating hydraulic circuit components equipped to an example vehicle and the example pantograph assembly of FIG. 1.

FIG. 14 depicts a block diagram of a vehicle 1400 equipped with pantograph assembly 10. In particular, FIG. 14 depicts a schematic arrangement of a hydraulic system and associated components located on vehicle 1400. The hydraulic system includes hydraulic integrated circuit 132, described above. Hydraulic integrated circuit 132, in the depicted embodiment, is fluidly coupled to a selector valve 1402 that can be located on vehicle 1400. Selector valve 1402 is coupled to hydraulic integrated circuit 132 via a pair of hoses 1404. Although the connection is shown as direct, as described above and as depicted in FIG. 7, hydraulic integrated circuit 132 may couple to selector valve 1402 via hydraulic junction 194 (seen in FIG. 7), as may be necessary to ensure appropriate hose routing for a given implementation. Other embodiments may be able to achieve appropriate house routing without requiring a junction block.

As discussed above and as visible in FIG. 14 as well as FIG. 7, hydraulic integrated circuit 132 may be secured to the pantograph assembly 10 by attachment to the back side (facing the operator cab of vehicle 1400), near the top of the mast carriage assembly 120. In some embodiments, hydraulic integrated circuit 132 may be coupled to the top of or an upward facing surface of trunnion cross member 128, allowing for easy replacement or servicing of the hydraulic integrated circuit 132. Hydraulic integrated circuit 132 is further coupled to one or more hydraulic components, as discussed above. In the example depicted in FIG. 14, hydraulic integrated circuit 132 is coupled to hydraulic ram 160, for extending the pantograph mechanism, to tilting hydraulic unit 188, for tiling forks attached to the fork carriage assembly, and to a side shift hydraulic unit 1406, for laterally shifting the position of the forks attached to the fork carriage assembly. Other hydraulic components may additionally or alternatively be coupled to the hydraulic integrated circuit 132, depending on the requirements of a given implementation.

Hoses 1404 may, in embodiments, comprise a pair of hydraulic hoses which can act as send and return lines for pressurized hydraulic fluid. In some embodiments, selector valve 1402 can selectively alternate between which of the pair of hydraulic hoses 1404 is the send, and the return lines. The send line is typically continuously subjected to high pressure hydraulic fluid regardless of whether a hydraulic component is actuated, while the return line may only be subjected to high pressure hydraulic fluid when a hydraulic component, such as hydraulic ram 160 or tilting hydraulic unit 188, is actuated. Thus, configuring the selector valve 1402 to alternate the send and return lines between each hose of the pair of hoses may reduce wear on the hydraulic hoses 1404 by alternating which hose is subjected to continual hydraulic fluid pressure. Furthermore, in such a configuration, hydraulic integrated circuit 1402 can be simplified in operation by only needing to change fluid routing to a selected component.

As will be understood by a person skilled in the art, each hydraulic component typically operates by accepting hydraulic fluid into one compartment while discharging from a second compartment. The compartments are divided by a moveable partition that prevents bypass of hydraulic fluid, such as a piston within a cylinder, which is coupled to a shaft to transmit force imparted by the hydraulic fluid upon the piston as the piston moves in response. The piston bisects the cylinder into two compartments on either side of the piston, with one compartment typically carrying the shaft to exit the cylinder, to allow the shaft to transmit the force imparted by the hydraulic fluid. Pressurizing the hydraulic fluid in one compartment causes the piston to attempt to move within the cylinder to expand the compartment and, as a result, impart a corresponding force to the coupled shaft. The direction of the piston's (and hence the shaft's) travel depends upon which compartment is pressurized. The compartment that is not pressurized is configured to allow hydraulic fluid to flow from the compartment, to facilitate the piston moving. Thus, a hydraulic component such as the hydraulic ram 160 can extend by pressurizing the compartment opposite the shaft, and can retract by pressurizing the compartment carrying the shaft. Where the selector valve 1402 selectively pressurizes one of the pair of hoses 1404, hydraulic integrated circuit 132 need only couple each of the pair of hoses 1404 with a line to each of the compartments of the hydraulic ram 160 without regard to which line is pressurized. Selector valve 1402 thus controls either the extension or retraction of the hydraulic ram 160 depending upon which of hoses 1404 is pressurized.

In other embodiments, one line can always be dedicated as the pressurized line of hoses 1404. In such a configuration, the hydraulic integrated circuit 132 can be configured to selectively couple the pressurized line to either line connected to the first or second compartment of hydraulic ram 160 to allow selecting between extension and retraction.

Although certain embodiments, have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a wide variety of ways. This application is intended to cover any adaptations or variations of the embodiments discussed herein. Therefore, it is manifestly intended that embodiments be limited only by the claims and the equivalents thereof.

What is claimed is:

1. A pantograph assembly for use on a vehicle, wherein the pantograph assembly comprises:
   a mast carriage assembly;
   a fork carriage assembly;
   a pantograph mechanism connected between the mast carriage assembly and the fork carriage assembly; and
   a hydraulic circuit comprised of:
      a hydraulic manifold coupled to the mast carriage assembly, the hydraulic manifold positioned such that the hydraulic manifold can be serviced without disassembly or removal of the pantograph assembly, and wherein the hydraulic manifold is configured to selectively actuate at least one of a plurality of hydraulic components fluidly coupled to the hydraulic circuit; and
      a selector valve that is mountable to the vehicle, wherein the selector valve is coupled to the hydraulic manifold via a pair of hydraulic lines, and the selector valve is configured to selectively pressurize one of a first hydraulic line and a second hydraulic line of the pair of hydraulic lines.

2. The pantograph assembly of claim 1, wherein the hydraulic circuit is configured to selectably extend the pantograph mechanism.

3. The pantograph assembly of claim 1, further comprising:
   a hydraulic ram pivotably coupled to the pantograph mechanism; and
   a set of wear-resistant hydraulic hoses;
   wherein the hydraulic ram is fluidly coupled to the hydraulic circuit through the set of wear-resistant hydraulic hoses.

4. The pantograph assembly of claim 3, wherein a pair of hoses from the set of wear-resistant hydraulic hoses are coupled together in a sheath as a pair.

5. The pantograph assembly of claim 4, wherein the sheath is a shrink wrapped nylon sheath.

6. The pantograph assembly of claim 4, wherein the fork tilting assembly comprises a tilt hydraulic ram coupled at a rear end to a fork carriage frame and coupled at a front end to a tilt cross-member.

7. The pantograph assembly of claim 1, further comprising a tilting hydraulic unit coupled to a fork tilting assembly, and wherein the hydraulic integrated circuit is configured to selectably actuate the tilting hydraulic unit to tilt the fork tilting assembly.

8. The pantograph assembly of claim 1, further comprising:
   a tilting hydraulic unit fluidly coupled to the hydraulic integrated circuit and configured to selectably tilt at least part of the fork carriage assembly; and
   a hydraulic ram fluidly coupled to the hydraulic integrated circuit and pivotably coupled to the pantograph mechanism, and configured to selectably extend or retract the pantograph mechanism.

9. The pantograph assembly of claim 8, further comprising an electronic controller coupled to the mast carriage assembly such that the electronic controller can be serviced without disassembly or removal of the pantograph assembly, the electronic controller coupled to the hydraulic integrated circuit.

10. The pantograph assembly of claim 9, wherein the electronic controller is configured to selectively actuate the hydraulic integrated circuit to adjust the tilt of the pair of forks, and to selectively actuate the hydraulic integrated circuit to adjust the extension of the pantograph mechanism.

11. The pantograph assembly of claim 1, wherein the hydraulic integrated circuit is secured to a trunnion cross member that is part of the mast carriage assembly.

12. The pantograph assembly of claim 1, wherein pantograph assembly is equipped to a materials handling vehicle, and the hydraulic integrated circuit is secured to the mast carriage assembly in a position that is away from a sightline of an operator of the materials handling vehicle.

13. The pantograph assembly of claim 1, wherein the hydraulic circuit is mounted to a portion of the mast carriage assembly that is facing the vehicle when the pantograph assembly is coupled with the vehicle.

14. The pantograph assembly of claim 13, wherein the hydraulic circuit is mounted to a top portion of the mast carriage assembly.

15. A pantograph assembly for use on a vehicle comprising:
a mast carriage assembly including a means for movably coupling the mast carriage assembly to a mast;
a pantograph mechanism including a means for coupling the pantograph mechanism to the mast carriage assembly;
a fork carriage assembly including a means for coupling the fork carriage assembly to the pantograph mechanism; and
a hydraulic integrated circuit mounted to a rear of the mast carriage assembly such that the hydraulic integrated circuit can be serviced without disassembly or removal of the mast carriage assembly or pantograph mechanism, the hydraulic integrated circuit including a means for selectably extending or retracting the pantograph mechanism, wherein the hydraulic integrated circuit further includes a selector valve that is configured to selectively pressurize one of a first hydraulic line and a second hydraulic line of the pair of hydraulic lines.

16. The pantograph assembly of claim 15, wherein the hydraulic integrated circuit includes a means for selectably tilting a fork secured to the fork carriage assembly.

17. The pantograph assembly of claim 16, further comprising an electronic control means for causing the hydraulic integrated circuit to extend or retract the pantograph mechanism, and for causing the hydraulic integrated circuit to adjust the tilt of the fork.

18. The pantograph assembly of claim 17, wherein the electronic control means is mounted to a rear portion of the mast carriage assembly such that the electronic control means can be serviced without disassembly or removal of the mast carriage assembly or pantograph mechanism.

19. The pantograph assembly of claim 15, further comprising a means for coupling the hydraulic integrated circuit to the means for selectably extending or retracting the pantograph mechanism.

* * * * *

UNITED STATES PATENT AND TRADEMARK OFFICE
CERTIFICATE OF CORRECTION

PATENT NO. : 11,274,022 B2
APPLICATION NO. : 17/009467
DATED : March 15, 2022
INVENTOR(S) : Weiss et al.

Page 1 of 1

It is certified that error appears in the above-identified patent and that said Letters Patent is hereby corrected as shown below:

In the Specification

In Column 2, Line 49, delete "is right" and insert --is a right-- therefor.

In Column 6, Line 48, delete "incudes" and insert --includes-- therefor.

In Column 6, Line 49, delete "coupled the" and insert --coupled-- therefor.

In Column 6, Line 57, delete "incudes" and insert --includes-- therefor.

In Column 8, Line 3, delete "refracted" and insert --retracted-- therefor.

In Column 8, Line 4, delete "incudes" and insert --includes-- therefor.

In Column 8, Line 19, delete "that are" and insert --are-- therefor.

In Column 11, Line 30, delete "incudes" and insert --includes-- therefor.

In Column 12, Line 8, delete "incudes" and insert --includes-- therefor.

In Column 12, Line 10, delete "coupled the to" and insert --coupled to-- therefor.

In Column 12, Line 18, delete "incudes" and insert --includes-- therefor.

Signed and Sealed this
Twenty-seventh Day of August, 2024

Katherine Kelly Vidal
*Director of the United States Patent and Trademark Office*